United States Patent

[11] 3,627,676

[72] Inventor Edwin J. Eccles, Jr.
 Mount Holly, N.C.
[21] Appl. No. 119,000
[22] Filed Feb. 25, 1971
[45] Patented Dec. 14, 1971
[73] Assignee Martin Marietta Corporation

[54] METHOD FOR OXIDIZING THE THIOSULFATE IONS IN A THIOSULFATE
 2 Claims, No Drawings
[52] U.S. Cl.................................................. 210/11,
 23/121, 23/167, 210/15, 210/63
[51] Int. Cl....................................................... C02c 5/04
[50] Field of Search.......................................... 210/11, 15,
 63; 23/121, 167

[56] References Cited
FOREIGN PATENTS
228,637 6/1960 Australia...................... 210/11

Primary Examiner—Michael Rogers
Attorneys—John A. Crowley, Jr., Francis J. Mulligan, Jr. and Wilton Rankin ABSTRACT: Method for oxidizing the thiosulfate ions in a thiosulfate waste comprising establishing a liquid aqueous oxidative zone; introducing dilute aqueous $Na_2S_2O_3$, aqueous $NH_4OH$, and aqueous $H_3PO_4$ into the zone; aerating and agitating the result at pH 1.4-1.6 until the $Na_2S_2O_3$ is oxidized to the hydrolysis products of sodium sulfate and sulfuric acid; and withdrawing aqueous liquid from the zone.

METHOD FOR OXIDIZING THE THIOSULFATE IONS IN A THIOSULFATE

The present invention relates to oxidizing wastes, and more particularly to a method for oxidizing the thiosulfate ions in a thiosulfate waste.

The method of the present invention is useful in that it may be incorporated into a waste treatment system directed to disposing of thiosulfate ions. Waste thiosulfate is produced at sulfur dyestuff plants, certain chemical plants, and certain textile-finishing plants.

Generally speaking, the method of the present invention may be described as a method for oxidizing the thiosulfate ions in a thiosulfate waste comprising establishing a liquid aqueous oxidative zone at pH 1.4–1.6 and 8°–30° C.; introducing a dilute waste comprising approximately 1 percent sodium thiosulfate, and aqueous $NH_4OH$ and aqueous $H_3PO_4$ into the zone while maintaining the zone at pH 1.4–1.6; agitating and continuously essentially saturating the zone with unsterilized air; and withdrawing aqueous liquid from the zone so as to permit sufficient residence time to convert substantially all of the sodium thiosulfate to the hydrolysis products of $H_2SO_4$ and $Na_2SO_4$.

Thiosulfate ions are notoriously bad stream pollutants. They are known as an antichlor. When water containing thiosulfate ions is taken into a water purification plant, the sodium hypochlorite or chlorine gas added at the purification plant as a purification aid slowly reacts with sodium thosulfate to form sodium tetrathionate, thereby undesirably eliminating or reducing the residual chlorine content of the treated water.

According to the method of the present invention, substantially all of the sodium thiosulfate may be oxidized to an aqueous solution of $H_2SO_4$ and $Na_2SO_4$, and thiosulfate ions need not be discharged into streams.

One important objective of the present invention is to produce a treated liquid waste which can be readily neutralized with an inexpensive base. The waste which results from the process of the present invention, namely a waste in which substantially all of the sodium thiosulfate has been oxidized to $H_2SO_4$ and $Na_2SO_4$ in aqueous solution, may be neutralized with inexpensive bases, such as ground limestone or hydrated lime.

It is surprising that the process of the present invention functions at pH 1.4–1.6 to convert $Na_2S_2O_3$ into $H_2SO_4$ and $Na_2SO_4$ in aqueous solution, as it has been taught in the art that the thiosulfate ion, $S_2O_3^=$, is relatively stable and that there is no decomposition of the thiosulfate until a hydrogen ion concentration of $2.5 \times 10^{-2}$ (pH 1.6021) is reached, at which point the $HS_2O_3^-$ ion is formed, which rapidly decomposes to liberate sulfur. See Kirk-Othmer, "Encyclopedia of Chemical Technology," vol. 14, p. 103.

The following is a more detailed description of the process of the present invention. All parts and percentages in the specification and claims are by weight, unless otherwise specified.

The process of the present invention may be described as a method for oxidizing the thiosulfate ions in a thiosulfate waste, comprising the steps of:

a. establishing a liquid aqueous oxidative zone at 8°–30° C. and pH 1.4–1.6 by agitating and continuously essentially saturating with unsterilized air an aqueous composition having pH 5–7 and comprising approximately 1 percent sodium thiosulfate, 0.00195–0.0117 percent $NH_4OH$, and 0.0054–0.0324 percent $H_3PO_4$ until the composition reaches pH 1.4–1.6 and substantially all of the sodium thiosulfate has been converted to the hydrolysis products of $H_2SO_4$ and $Na_2SO_4$;

b. continuously essentially saturating with unsterilized air and agitating said aqueous oxidative zone;

c. introducing into said aqueous oxidative zone a dilute aqueous thiosulfate waste comprising approximately 1 percent aqueous sodium thiosulfate, and also introducing into said aqueous oxidative zone 0.54–3.24 parts aqueous $H_3PO_4$ and 0.195–1.17 parts aqueous $NH_4OH$ to each 100 parts of sodium thiosulfate specified in this subparagraph (c), wherein parts are by weight computed on 100 percent basis $H_3PO_4$, $NH_4OH$ and $Na_2S_2O_3$, and in which the combination of products introduced into said aqueous oxidative zone has pH 4.0 or greater, while maintaining said aqueous oxidative zone within the range of pH 1.4–1.6; and d. withdrawing aqueous liquid from said aqueous oxidative zone so as to provide a residence time in said aqueous oxidative zone of said aqueous thiosulfate waste sufficient to convert substantially all of the sodium thiosulfate to the hydrolysis products of sodium sulfate and sulfuric acid.

A liquid zone is first established. The liquid of the zone may be in any suitable container, such as a glass beaker, or earthen basin which may be lined with a plastic or asphaltic liner. The process may be operated in a batch, continuous, or semicontinuous manner, and if it is desired to operate it in a continuous or semicontinuous manner, it will be convenient to fit the container with overflow means near its top.

The liquid oxidative zone may be established by mixing together an aqueous composition comprising approximately 1 percent sodium thiosulfate, 0.0054–0.0324 percent phosphoric acid and preferably 0.0108 percent, and 0.00195–0.0117 percent ammonium hydroxide and preferably 0.0039 percent, having initial pH 5–7, and agitating and continuously essentially saturating the composition with unsterilized air until the pH 1.4–1.6 is reached and substantially all of the sodium thiosulfate therein has been converted to $H_2SO_4$ and $Na_2SO_4$ in aqueous solution. Alternatively, the liquid oxidative zone may be established by slowly and gradually adding to a container an aqueous composition having pH 5–7 and comprising approximately 1 percent aqueous thiosulfate, 0.0054–0.0324 percent $H_3PO_4$ and preferably 0.0108 percent, and 0.00195–0.0117 percent $NH_4OH$ and preferably 0.0039 percent, while agitating and continuously essentially saturating with unsterilized air the composition in the oxidative zone, said addition continuing until pH 1.4–1.6 is reached and substantially all of the sodium thiosulfate has been converted into aqueous $H_2SO_4$ and $Na_2SO_4$. The time required to reach pH 1.4–1.6 and convert substantially all of the $Na_2S_2O_3$ to $H_2SO_4$ and $Na_2SO_4$ is largely a function of the temperature. The conversion is effected at 8°–30° C., and the higher the temperature the faster the conversion. Normally, about 7–30 days will be required to effect the conversion.

I do not know whether the thiosulfate conversion reaction is entirely chemical, or whether micro-organisms, such as *Thiobacillus thiooxidans* grow in the oxidative zone and participate in oxidizing the thiosulfate ions. I do not intentionally add or employ any bacteria in the process. However, if bacteria are present, they are automatically and inherently introduced from the atmosphere with the unsterilized air.

After the liquid aqueous oxidative zone has been established, it will be rich in aqueous solution of $H_2SO_4$ and $Na_2SO_4$, and will also contain the decomposition or hydrolysis products of $H_3PO_4$ and $NH_4OH$. The liquid aqueous oxidative zone is maintained at 8°–30° C., and pH 1.4–1.6, even during and after addition of the following waste thiosulfate. Moreover, the liquid aqueous oxidative zone is continuously essentially saturated with unsterilized air, during establishment of the zone, and during and after addition thereto of the following waste thiosulfate.

The sodium thiosulfate used in establishing the aqueous oxidative zone may be derived from waste or from other sources.

Thiosulfate has been analyzed herein by the standard iodine titration method, and references to parts and percentages thiosulfate are based on that method of analysis.

After the liquid aqueous oxidative zone has been established, it is ready to receive dilute aqueous thiosulfate waste for oxidation, and to receive aqueous $H_3PO_4$ and aqueous $NH_4OH$.

The thiosulfate waste is diluted with water to approximately 1 percent aqueous sodium thiosulfate. In adding the diluted thiosulfate waste, aqueous $H_3PO_4$ and aqueous $NH_4OH$ to the oxidative zone, they may be incorporated together and introduced simultaneously into the oxidative zone, or they may be introduced from separate streams into the oxidative zone, or the $H_3PO_4$ or $NH_4OH$ may be incorporated with the thiosulfate prior to addition to the zone and the remaining $H_3PO_4$ or $NH_4OH$ introduced into the zone as a separate stream. It is not suggested that aqueous $NH_4OH$ and aqueous $H_3PO_4$ be incorporated into a single stream for addition to the zone, while introducing dilute thiosulfate from a separate stream. The 1 percent aqueous sodium thiosulfate waste, aqueous $NH_4OH$, and aqueous $H_3PO_4$ which are added to the oxidative zone, if combined, will have pH 4.0 or greater.

For each 100-parts sodium thiosulfate added to the oxidative zone, 0.54–3.24 parts $H_3PO_4$ and preferably 1.08 parts, and 0.195–1.17 parts $NH_4OH$ and preferably 0.39 parts, all calculated on 100 percent basis, will also be added to the oxidative zone. The $H_3PO_4$, $NH_4OH$, and $Na_2S_2O_3$ added to the oxidative stream will be aqueous, although the foregoing parts have been calculated on 100 percent basis.

The liquid aqueous oxidative zone is maintained at pH 1.4–1.6 while and after the 1 percent aqueous sodium thiosulfate waste, aqueous $NH_4OH$ and aqueous $H_3PO_4$ are added thereto. That may be accomplished by adjusting the addition rate of those materials.

The aqueous sodium thiosulfate remains in the oxidative zone until substantially all of it is converted to the hydrolysis products of $H_2SO_4$ and $Na_2SO_4$. While the aqueous sodium thiosulfate is in the oxidative zone, the zone is agitated and continuously essentially saturated with unsterilized air, and the zone is maintained at pH 1.4–1.6 and 8°–30° C.

Aqueous liquid is withdrawn from the aqueous oxidative zone in a manner to provide a residence time in the aqueous oxidative zone of the thiosulfate waste sufficiently long to allow conversion of substantially all of the sodium thiosulfate to the hydrolysis products of sodium sulfate and sulfuric acid. The aqueous liquid is rich in $H_2SO_4$ and $Na_2SO_4$, and may be readily neutralized with ground limestone or hydrated lime prior to its discharge into a river.

It will be recognized that the process may be operated in a continuous or semicontinuous manner by providing an overflow for the container holding the products of the oxidative zone and feeding the thiosulfate waste, $H_3PO_4$, and $NH_4OH$ into the oxidative zone at a substantially constant rate and withdrawing the liquid from the oxidative zone at a substantially constant rate.

The following examples illustrate the method of the present invention.

EXAMPLE 1

The liquid waste resulting from production of C. I. Sulfur Black 1 dyestuff has about pH 7 and is rich in aqueous sodium thiosulfate. Such waste is diluted to 1 percent sodium thiosulfate content with water. To 4,000 ml. of the diluted waste comprising 1 percent sodium thiosulfate is added 0.3 ml. (0.27 gm.) 28 percent aqueous $NH_4OH$ and 0.3 ml. (0.51 gm.) 85 percent aqueous $H_3PO_4$, resulting in about pH 6.5, and the composition is held at 0°–5° C. to prevent reaction.

An open top vessel having an overflow outlet at the 6,000 ml. level is equipped with a gas dispersion tube extending to the bottom thereof, said tube being connected to an air pump. Unsterilized air is supplied continuously to the vessel by this means, and the air bubbles serve to agitate and continuously essentially saturate with air the composition after it is added to the vessel. The above dilute composition of sodium thiosulfate, $NH_4OH$ and $H_3PO_4$ is continuously fed through a tube into the bottom of the vessel at the rate of 0.6 ml./minute, and the temperature of the composition collected in the vessel is permitted to rise to and remain at ambient temperature. Additional quantities of the foregoing dilute composition of $Na_2S_2O$, $H_3PO_4$ and $NH_4OH$ are prepared and fed continuously in the foregoing manner. About 7 days after commencing feeding, overflow from the vessel commences, which overflow is discarded. About 8 days after commencing feeding, the thiosulfate content of the overflow is reduced to substantially zero, and about 14 days after commencing feeding, the acidity of the contents of the vessel and the overflow has stabilized at pH 1.4–1.6, and the overflow is substantially devoid of thiosulfate ions and is rich in aqueous $H_2SO_4$ and $Na_2SO_4$. The aqueous oxidative zone has been thus established, and while the aeration and agitation are continued in the vessel, additional diluted waste containing $Na_2S_2O_3$, $H_3PO_4$, and $NH_4OH$ as described in the first paragraph of this example 1 are fed into the vessel at 0.6 ml./minute indefinitely, thereby maintaining the contents of the vessel at pH 1.4–1.6 and at ambient temperature. The overflow from the vessel continues to be substantially devoid the thiosulfate ions and rich in aqueous $H_2SO_4$ and $Na_2SO_4$. No sludge is formed during the process. The overflow may be neutralized with ground limestone or hydrated lime.

EXAMPLE 2

Liquid waste resulting from production of C. I. Sulfur Black 1 dyestuff is diluted to 1 percent sodium thiosulfate content with water. Six thousand milliliters of the diluted waste is added to a filter flask, and 1.35 ml. (1.215 gm.) 28 percent aqueous $NH_4OH$ and 1.35 ml. (2.295 gm.) 85 percent aqueous $H_3PO_4$ added thereto with mixing; the acidity is adjusted to pH 7.0. The composition is maintained at 30° C., while it is agitated and continuously essentially saturated with unsterilized air in the manner described in example 1 above until the acidity stabilizes at pH 1.4 and substantially all of the sodium thiosulfate has been converted to the hydrolysis products of $H_2SO_4$ and $Na_2SO_4$. At that point the liquid aqueous oxidative zone has been established. Aeration is continued.

A liquid waste is prepared by diluting liquid waste resulting from the production of C. I. Sulfur Black 1 dyestuff to 1 percent sodium thiosulfate content with water. To 6,000 ml. of the diluted waste is added 1.35 ml. (1.215 gm.) 28 percent aqueous $NH_4OH$ and 1.35 ml. (2.295 gm.) 85 percent aqueous $H_3PO_4$ with mixing; the composition is adjusted to pH 4 and fed into the bottom of the above filter flask via a tube at the rate of 0.6 ml./minute, while maintaining the contents of the filter flask at 30° C. and about pH 1.4 and while agitating, continuously essentially saturating the contents of the filter flask with unsaturated air in the above described manner. The overflow from the filter flask is substantially devoid of thiosulfate ions and is rich in the hydrolysis products of $H_2SO_4$ and $Na_2SO_4$. No sludge is formed during the process, and the overflow may be neutralized with ground limestone or hydrated lime.

EXAMPLE 3

To 4,000 ml. 1 percent aqueous sodium thiosulfate is added 0.15 ml. (0.135 gm.) 28 percent aqueous $NH_4OH$ and 0.15 ml. (0.255 gm.) 85 percent aqueous $H_3PO_4$. The composition is mixed, adjusted to pH 5, and maintained at 0°–5° C.

An open top vessel having an overflow outlet at the 6,000 ml. level is equipped with a gas dispersion tube extending to the bottom thereof, said tube being connected to an air pump. Unsterilized air is supplied continuously to the vessel by this means, and the air bubbles serve to agitate and continuously essentially saturate with air the composition added to the vessel. The above dilute composition of sodium thiosulfate, $NH_4OH$ and $H_3PO_4$ is continuously fed through a tube into the bottom of the vessel at the rate of 0.6 ml./minute, and the temperature of the composition collected in the vessel is maintained at 8° C. Additional quantities of the composition described in the first paragraph of this example 3 are prepared as needed and continuously fed into the vessel in the foregoing manner. When the overflow from the vessel has stabilized at pH 1.5–1.6 and the overflow is substantially devoid of thiosulfate ions, the liquid aqueous oxidative zone has been established in the vessel. Aeration of the vessel is continued; the vessel contents are maintained at 8° C.; and the feed tube is removed from the vessel.

The acidity of the composition being fed into the vessel is adjusted to pH 7, and the feed tube reinserted into the vessel and the continuous feed rate is adjusted so that the contents of the vessel remain at 8° C. and pH 1.5–1.6, and so that the overflow from the vessel has pH 1.5–1.6 and is substantially devoid of thiosulfate ions and rich in the hydrolysis products of $Na_2SO_4$ and $H_2SO_4$. The aeration and agitation of the contents of the vessel are continued throughout the process in the above manner. No sludge is formed during the process, and the overflow may be neutralized with ground limestone or hydrated lime.

What is claimed is:

1. A method for oxidizing the thiosulfate ions in a thiosulfate waste, comprising the steps of:
    a. establishing a liquid aqueous oxidative zone at 8°–30° C. and pH 1.4–1.6 by agitating and continuously essentially saturating with unsterilized air an aqueous composition having pH 5–7 and comprising approximately 1 percent sodium thiosulfate, 0.00195–0.0117 percent $NH_4OH$, and 0.0054–0.0324 percent $H_3PO_4$ until the composition reaches pH 1.4–1.6 and substantially all of the sodium thiosulfate has been converted to the hydrolysis products of $H_2SO_4$ and $Na_2SO_4$;
    b. continuously essentially saturating with unsterilized air and agitating said aqueous oxidative zone;
    c. introducing into said aqueous oxidative zone a dilute aqueous thiosulfate waste comprising approximately 1 percent aqueous sodium thiosulfate, and also introducing into said aqueous oxidative zone 0.54–3.24 parts aqueous $H_3PO_4$ and 0.195–1.17 parts aqueous $NH_4OH$ to each 100 parts of sodium thiosulfate specified in this subparagraph (c), wherein parts are by weight computed on 100 percent basis $H_3PO_4$, $NH_4OH$ and $Na_2S_2O_3$, and in which the combination of products introduced into said aqueous oxidative zone has pH 4.0 or greater, while maintaining said aqueous oxidative zone within the range of pH 1.4–1.6; and
    d. withdrawing aqueous liquid from said aqueous oxidative zone so as to provide a residence time in said aqueous oxidative zone of said aqueous thiosulfate waste sufficient to convert substantially all of the sodium thiosulfate to the hydrolysis products of sodium sulfate and sulfuric acid.

2. A method as defined in claim 1, and wherein said parts of aqueous $H_3PO_4$ is 1.08; and said parts of aqueous $NH_4OH$ is 0.39.

* * * * *